EMERGENCY BRAKE ACTUATOR

Original Filed April 24, 1963 3 Sheets-Sheet 1

INVENTORS
Frank T. Cox, Jr.
BY Howard A. Sherretts
George P. Mathews
Attorneys

EMERGENCY BRAKE ACTUATOR

Original Filed April 24, 1963 3 Sheets-Sheet 2

INVENTOR.
Frank T. Cox, Jr.
BY Howard A. Sherretts
George P. Mathews
Attorneys

EMERGENCY BRAKE ACTUATOR

Original Filed April 24, 1963 3 Sheets-Sheet 3

INVENTORS
Frank T. Cox, Jr.
Howard A. Sherretts
George P. Mathews

BY

ATTORNEYS

United States Patent Office

Re. 26,432
Reissued Aug. 6, 1968

26,432
EMERGENCY BRAKE ACTUATOR

Frank T. Cox, Jr., Ashtabula, Ohio, Howard A. Sherretts, Linesville, Pa., and George P. Mathews, Cloverdale, Calif., assignors, by mesne assignments, to American Standard Inc., a corporation of Delaware Original No. 3,295,423, dated Jan. 3, 1967, Ser. No. 491,455, Sept. 29, 1965, which is a division of Ser. No. 275,375, Apr. 24, 1963, now Patent No. 3,232,175, dated Feb. 1, 1966. Application for reissue June 8, 1967, Ser. No. 651,636

3 Claims. (Cl. 92—63)

Matter enclosed in heavy brackets [ ] appears in the original patent but forms no part of this reissue specification; matter printed in italics indicates the additions made by reissue.

*ABSTRACT OF THE DISCLOSURE*

*A brake actuator comprises a casing having aligned service and emergency chambers extending oppositely from a common internal wall, a first piston in the service chamber connected to brake mechanism, a second piston in the emergency chamber, the second piston having a part extending through the wall to engage the first piston, a cover detachably secured to the casing at the outer end of said emergency chamber, compression springs mounted in a plurality of separate pockets in the cover circumferentially spaced around the axis of said actuator and cooperating aligned spring guide formations on said second piston and the cover.*

This application is a division of application, Serial No. 275,375 filed April 24, 1963 for Brake Systems now Patent No. 3,232,175 granted February 1, 1966.

The present invention relates to brake systems and more particularly to combined service and emergency brake systems particularly suited for actuation by hydraulic fluid.

Emergency brake actuators for motor vehicles are known which comprise a pressure chamber, piston and spring means which, in normal operation, are held in a released position by the pressure in the service brake system. When the pressure in the normal service brake system drops below a certain value because of a leak or for other reasons a compressed spring expands and acts on the service brake pushrod to actuate the brakes. These prior devices are usually attached well outside the brake drum and directly on or in the vicinity of the service brake actuator and both actuators are attached by brackets to the vehicle axle in position to actuate a pushrod connected to a brake lever or slack adjustor to rotate a brake cam shaft.

Modern vehicle design and design of chassis for special vehicles make it imperative to reduce the overall space needed for the brake actuating mechanisms. Recently, fluid brake actuating mechanisms have been developed which act on the brake shoes essentially directly without a rotating cam shaft and brake lever. An example of such a mechanism is disclosed in United States Patent 3,037,584 owned by applicants' assignee. In this or similar brake mechanisms the brake actuator is attached directly to the brake support and may be well within the brake drum. Because of the limited space available in such structures the large and bulky prior emergency brake actuators cannot be accommodated. The space limitation is even more severe in hydraulic brake actuators which are usually much smaller than pneumatic actuators. Thus, the prior devices designed for air actuation cannot be incorporated in hydraulic systems.

Further, to achieve effective emergency brake application particularly in heavy duty vehicles a relatively large powerful spring must be employed which further increases the size of the emergency actuator.

With these considerations in mind it is a principal purpose and object of the present invention to provide novel emergency brake systems including an actuator mechanism which is particularly suitable for use with hydraulic brake actuators and which is attached to the hydraulic cylinder to provide a relatively small compact integral unit which may be readily accommodated within the restricted spaces available in such systems.

It is another object of the present invention to provide improved hydraulic brake actuating cylinders having an apertured end wall from which a cup shaped member extends to form the pressure chamber of an integral emergency actuator and having a separate cup shaped cover attached to the cup shaped member to form a closed chamber therewith.

It is a further object of the present invention to provide in an emergency brake actuator mechanism an enclosure, a piston in said enclosure which has a radial flange dividing the enclosure into a hydraulic pressure chamber and a mechanical pressure chamber, the mechanical pressure chamber being provided with springs means which act on the piston in a direction to effect emergency application of the brakes.

A further object resides in the provision of a combined hydraulic mechanical emergency brake actuator provided with energy storing means which comprise a number of separate coil springs having identical spring rates and which are adapted to act as a unit.

This novel arrangement of separate actuator springs in an emergency brake chamber instead of one large spring or two or three springs nested within each other permits a susbstantial reduction in the size of the emergency brake chamber. This arrangement makes it possible to effectively vary the brake application power to suit the requirements of different installations by varying the number of springs in the unit without changing the size of the chamber.

A further object is to provide in an emergency brake actuator, an actuator piston in a chamber closed by a removable cap, a set of powerful springs between the cap and the piston and means for locking the piston to the cap with the springs compressed between the cap and the piston to thus permit installation and removal of the cap, springs and pistons as a unit. It is also an object of the present invention to provide improved brake systems including emergency brakes which are applied automatically upon failure of the service brakes and which may be applied or released manually as desired.

It is an additional object of the invention to provide novel hydraulic brake systems of the so-called full power type or of the vacuum boost type incorporating automatic or manually operated emergency brakes.

Other objects and novel features will become apparent from the following detailed description in connection with the appended drawings in which.

Figure 1:
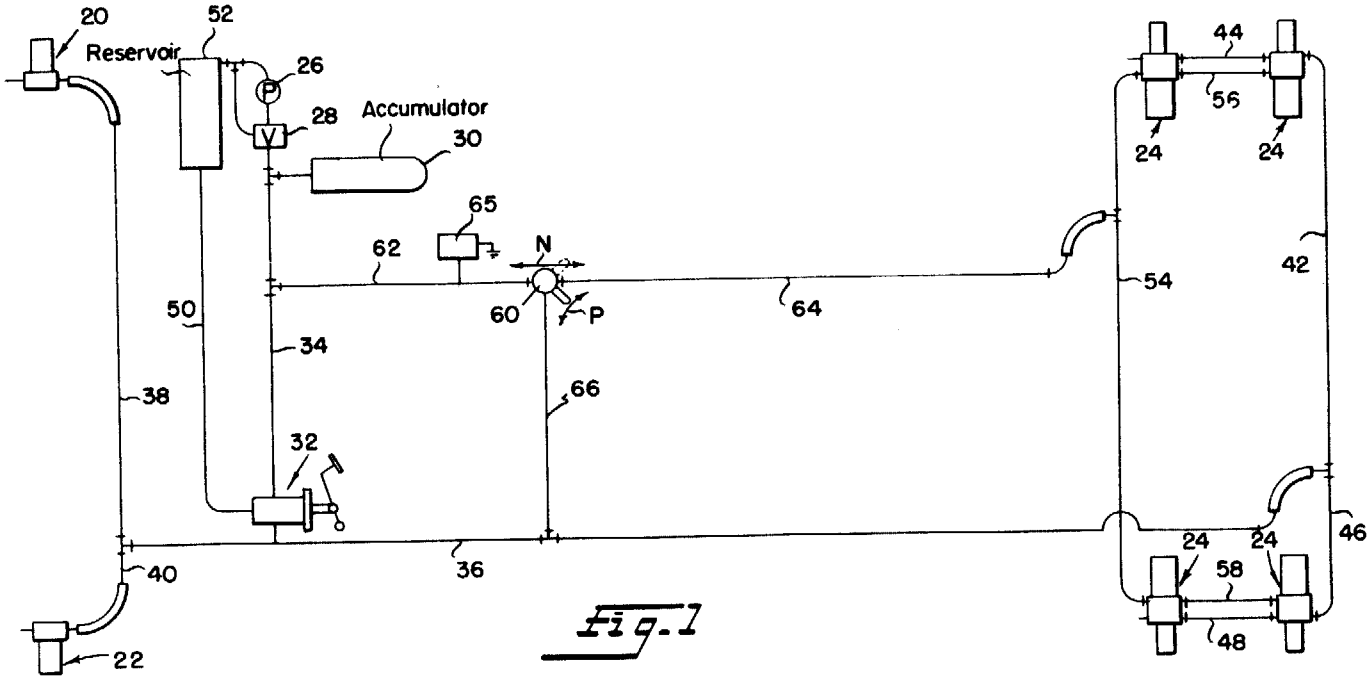
FIGURE 1 is a diagrammatic illustration of one form of improved brake system of the present invention showing both the normal service brake and the emergency brake.

FIGURE 1, to which detailed reference will now be made, illustrates diagrammatically the combined normal service brake system and the emergency brake system as applied to a truck having a pair of front wheel brake actuator assemblies indicated generally at 20 and 22 which are of conventional construction and dual rear brake units each comprising identical actuator assemblies 24 which are shown in detail in FIGURES 2 and 3 and will be described below. Each of these units may be associated with the brake assemblies, which have been omitted for clarity, in the manner disclosed for example, in United States Patent No. 3,037,534.

The system shown in FIGURE 1 is the full power hydraulic type in which the pressure is developed in the system by a pump 26 which may be driven by the vehicle engine or by an electric motor. The output side of the pump 26 is connected through a conventional bypass relief and check valve assembly 28 to an accumulator 30, these components being effective to deliver hydraulic fluid under predetermined pressure to the inlet side of the usual pedal operated brake valve assembly 32. Thus unit is a commercially available item and is effective to meter fluid under pressure from the main pressure line 34 to the main brake service line 36 connected to the front brake actuators 20 and 22 by branch lines 38 and 40, respectively, and connected to the rear brake actuator assemblies 24 through brance lines 42, 44, 46 and 48. Thus, operation of the valve 32 simultaneously supplies hydraulic fluid under controlled pressure to each of the brake actuator assemblies, the valve 32 being so arranged that when it is returned to its off position the main brake line 36 is connected through the valve and a line 50 to a reservoir 52. The brakes are released by a suitable return spring which is of wholly conventional construction.

As explained in detail below the emergency brake actuators are so constructed that they are applied by heavy spring pressure and are released by the application of hydraulic pressure applied to the units through lines 54, 56 and 58.

A conventional commercially available valve assembly 60 is effective in its normal position to connect a high pressure line 62 to the line 54 through a line 64 and in a second or "park" position to connect the line 64 to the service brake line 36 through a branch line 66. The construction of valve 60 is such that it is spring urged to the park position but is held in its normal position by system presure above a preset level.

The valve 60 may be moved manually to its park position to connect the emergency actuators to the reservoir through the lines 64, 66, 36, the brake valve 32, and the line 50 to permit the application of the emergency brakes.

The system also includes a low pressure warning device 65 to provide a visible or audible signal in the event the system pressure drops below 50% of its normal level.

Figure 2:
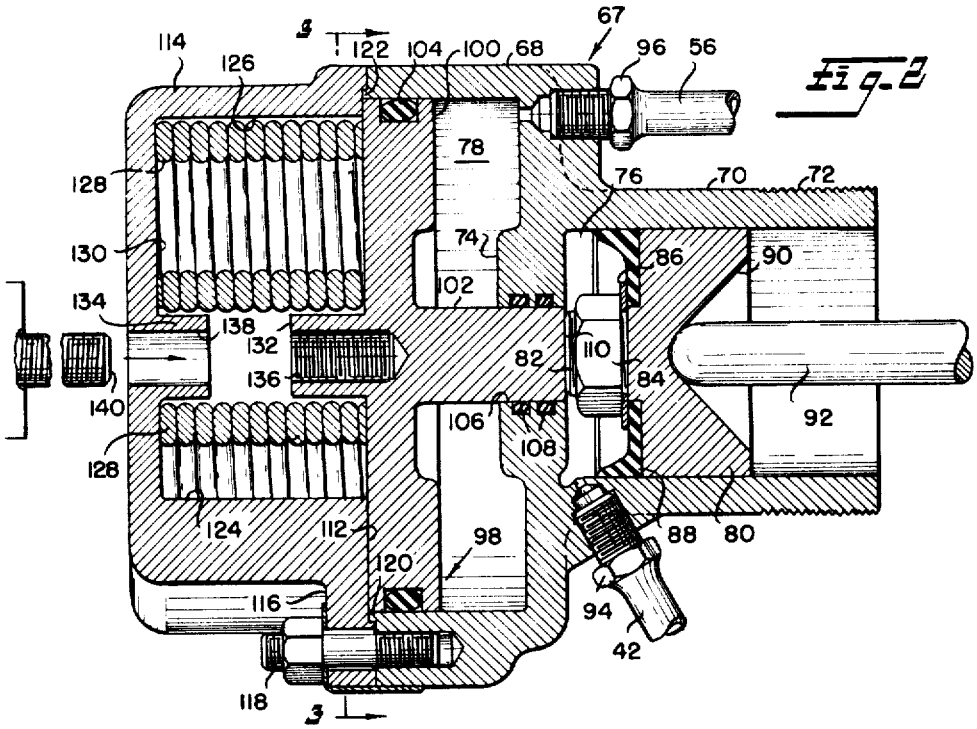
FIGURE 2 is a longitudinal central section through the combined emergency and service brake unit of the present invention.
Figure 3:
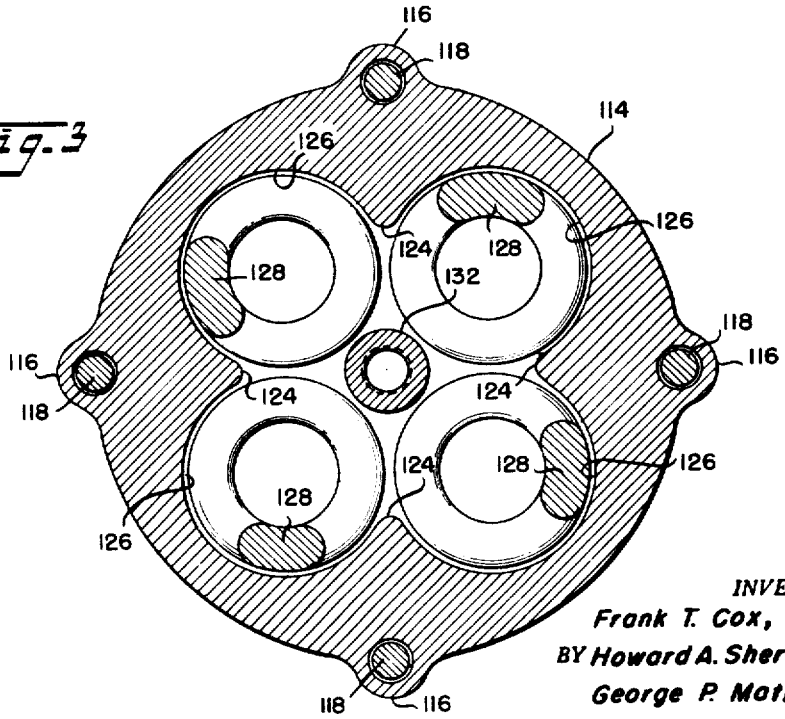
FIGURE 3 is a transverse section through the emergency chamber taken along line 3—3 of FIGURE 2.

FIGURES 2 and 3, to which detailed reference will now be made, illustrate one of the identical comibned service and emergency brake actuator assemblies 24.

This unit comprises a main housing 67 including a cup-shaped portion 68 having a cylindrical extension 70 provided at its open end with threads 72 for attachment the brake spider or support plate (not shown) in the manner disclosed in the aforementioned Patent No. 3,037,584. The cup-shaped part 68 and the cylindrical part 70 are internally divided by a radial wall 74 providing two pressure chambers 76 and 78 at opposite sides of the wall. Chamber 76 within the cylindrical part 70 contains the main service brake piston 80 having a central rearward threaded stub portion 82 on which is threaded a nut 84 clamping a lock ring 86 against the inner flange of a piston seal 88 to retain the seal on the piston. The front end of the piston is provided with a reccess 90 having a semispherical bottom against which the semispherical end of a pushrod 92 abuts. Pushrod 92 is connected to a brake shoe actuating mechanism (not shown) in a manner known per se from the earlier mentioned Patent No. 3,037,584.

An inlet fitting 94 connected in the usual manner with one of the service brake lines 42, 44, 46 and 48 provides the pressure chamber 76 with hydraulic fluid. As is conventional in such systems, chamber 76 may also be provided with a bleeder valve fitting (not shown).

Chamber 78 within the cup structure 68 is also provided with an inlet fitting 96 which extends through the intermediate wall portion 74 and is connected to one of the lines 54, 56 or 58 leading to the emergency system and may also be provided with a bleeder valve fitting (not shown) as is usual. Chamber 78 contains a piston 98 which comprises a radial flange 100 carrying a seal ring 102 and integral piston stem 104 extending through a central aperture 106 in the wall section 74. Aperture 106 is sealed by means of O-rings 108 against leakage between the chambers 76 and 78. The end surface 110 of the stem abuts the stub portion 82 on service brake piston 80 in their normal position.

Rearward travel of the emergency piston 98 is limited by a rim portion 112 of a cup-shaped cover 114 which closes the cup structure 68 and thereby completes the emergency brake chamber assembly. Cover 114 has a number of radial flanges 116 through which bolt and nut assemblies 118 extend to attach the cover to the cup structure. The rim portion 112 of the cover 114 is also provided with an external pilot flange 120 to match the internal pilot flange 122 on the cup structure to correctly position the cover on the cup. The internal wall surface of the cover 114 has a number of inwardly extending ridges 124 to define generally cylindrical spaces 126 which receive and contain a corresponding number of individual coil springs 128 compressed between the piston flange 100 and the end wall 130 of the cover. The coil springs 128 are centrally separated by a round plug or boss 132 extending outwardly from the piston flange opposite the piston stem 104. Plug 132 cooperates with the walls of cover 60 to keep the springs in their initial position. Another plug 134 or boss extends inwardly from the inner surface of the endwall 130 to provide central axial alignment for the springs.

Thus, the coil springs 128 are securely nested in the recesses of the cover 114 preventing undue transverse movement of the springs and keeping them separate, without interfering with the free expansion and contraction of the springs.

The coil springs are preferably of identical size and have identical performance characteristics to provide a balance of forces acting on the piston.

The use of a number of separate identical springs substantially increases the spring forces which can be developed in an actuator of a given size, or, conversely, permits a substantial reduction in the size of the actuator to provide a spring force of a desired value.

The extension 132 of the piston 98 is provided with a threaded bore 136 and the boss 134 is provided with an axial aperture 138 of slightly larger diameter than the bore 136 and coaxial therewith. The threaded bore 136 and aperture 138 are provided to allow insertion of a tool 140 through the cover and attachment thereof to the piston 98 to manually retract the piston and thereby compress the springs 128 between the end wall of the cover and the piston flange. Thus, the cover 114, piston 98 and springs 128 comprise an independent subassembly which can be easily detached from and assembled to the service cylinder. Also, the springs may be conveniently compressed which is especially important after an emergency brake application in order to release the brakes so that the vehicle can be moved.

The parts of the service and emergency brake unit are normally in the position as shown in FIGURE 2, that is, the service brake piston 80 and emergency piston 98 are at their rearmost positions with the piston stem 104 of the emergency piston abutting the stub portion 82 of the service brake piston. As long as there is pressure in the accumulator 30 and the valve 60 is in its normal position the emergency piston will be held in its fully retracted position by fluid pressure within chamber 78. The brakes may be applied in the normal manner by actuating the valve 32 which applies fluid pressure to chamber 76 through inlet fitting 94, forcing piston 80 outwardly. The pressurized fluid is prevented from leaking through apertures 106 into the chamber 78 by the seals 108. Thus, during normal application of the service brakes the emergency piston 98 remains in the rearmost position as shown due to sufficient hydraulic pressure in emergency chamber 78.

Under emergency conditions, that is, when hydraulic pressure in the accumulator 30 drops below a predetermined minimum due to leakage in the service brake line when the valve 32 is open or due to failure of the pump 26 or for other reasons, the pressure within emergency chamber 78 likewise drops until the force exerted by the springs 128 overcomes the pressure in chamber 78 and the springs expand forcing the emergency piston 98 forwardly thereby pushing service piston 80 forwardly to apply the brakes. A similar result may be achieved when the valve 60 is moved either manually or automatically to the park position thus connecting the chamber 78 to the reservoir 52 through the valve 32. The emergency piston may be subsequently retracted by returning the valve 60 to its normal position.

After an emergency application due to accidental pressure loss the tool 140 may be inserted through aperture 138 and attached to the piston 98 to manually compress the springs 72 and thereby release the brakes so that the vehicle can be moved for repair.

Figure 4:
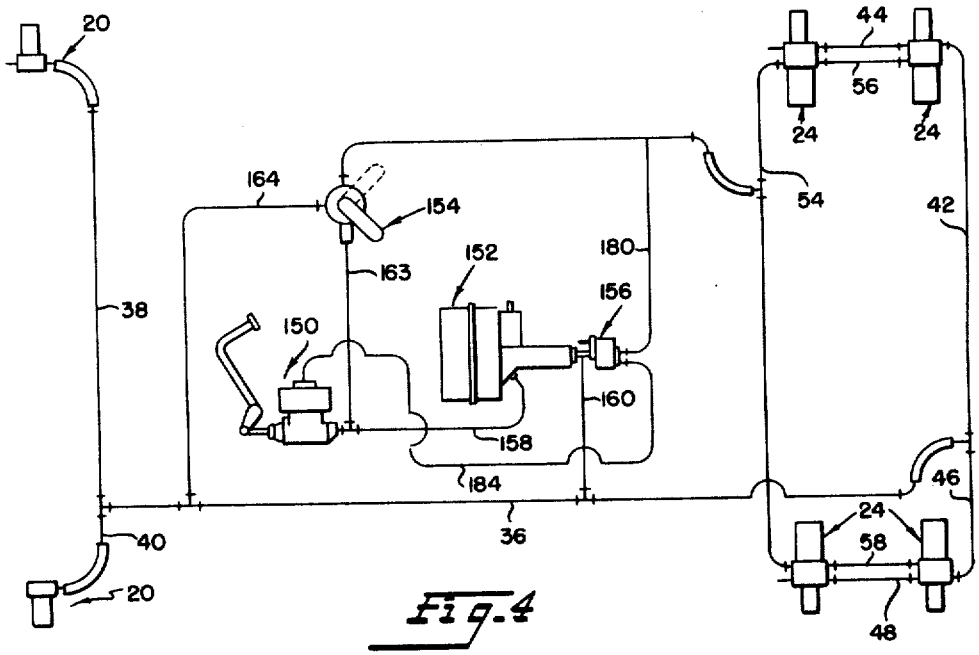
FIGURE 4 is a diagrammatic illustration of a modified brake control system incorporating the brake mechanism shown in FIGURES 2 and 3.
Figure 5:
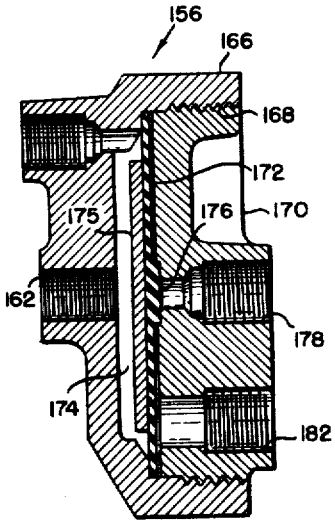
FIGURE 5 is an enlarged central section of one component of the system of FIGURE 4.

The invention also comprises a vacuum boosted hydraulic brake system for controlling the operation of the service and emergency brakes. This system, which is illustrated in FIGURES 4 and 5, includes the front brake assemblies 20 served by the service line 36 and branch lines 38 and 40 and the rear combined service and emergency brake assemblies 24 which are identical with the corresponding components of FIGURE 1. The principal additional components of the system include a brake operating unit 150 which is of conventional construction, including a brake pedal master cylinder and an auxiliary fluid reservoir having a capacity of some 20 cubic inches in a typical case. The system also includes a conventional vacuum power booster assembly 152 which contains a residual pressure valve conventional in such units. The system is completed by a two position manual control valve 154 and an automatic valve 156 shown separately in FIGURE 5.

The pressure side of the master cylinder is connected to the booster 152 by a line 158 and the outlet side of the booster 152 is connected to the main service brake line 36 by a conduit 160 which is also connected to an inlet fitting 162 in the valve 156 as explained below. The valve 154 in its normal position connects a branch line 163 to the conduit 164 connected to the emergency brake chambers. The valve 154 also includes a check valve preventing flow from the conduit 164 into the conduit 163. Thus, when the valve 154 is in its park position, fluid is dumped from the emergency brake chambers into the service line 36 for return to the reservoir in the unit 150 through the conduits 160 and 158. The emergency brake chambers are initially charged by pumping the brake pedal associated with the unit 150 with the valve 154 in its normal position.

The automatic valve 156 comprises an essentially cylindrical body 166 having a threaded bore 168 into which a cover 170 is threaded. A resilient diaphragm assembly 172 is peripherally clamped between the bottom of bore 168 and the inner surface of the cover 170. The chamber 174 at the left side of the diaphragm assembly 172 is connected to the normal service brake line through the opening 162. The diaphragm 172 is supported at one side by a plate 175 and at its opposite side by the cover 170.

The residual pressure valve incorporated in the booster unit 152 maintains a pressure in chamber 174 of 12 p.s.i. to 22 p.s.i. when the operation of the system is normal. This pressure urges a central sealing portion 176 on the diaphragm assembly 172 into sealing contact with the inner end of an inlet port 178 connected by a branch line 180 to the emergency brake pressure line 164. Thus, when the diaphragm is in the position shown in FIGURE 5 the flow of fluid is prevented from the inlet port 178 to an outlet port 182 connected by a line 184 to the master cylinder reservoir.

Assuming that the vehicle has been at rest for some time and that the pressure throughout the system is low, the emergency brakes will be urged to their "on" position by the action of the springs 128. If the valve 154 is moved to its normal position, the necessary emergency brake releasing pressure can be developed in line 164 by repeatedly pumping the brake pedal. This action will also establish a substantial pressure in the valve chamber 174 even if the booster 152 is not in operation. This pressure will be sufficient to maintain the port 178 closed. While the pressure in lines 164 and 180 leading to the port 178 is much higher than the opposing pressure in chamber 174, the area on which the pressure in chamber 174 acts is approximately 80 times as great as the area on which the opposing pressure acts. In a typical case the dimensions of the unit 156 and the pressures developed in the emergency brake chambers and the main service line are such that the diaphragm assembly will be held in sealing engagement with the port 178 so long as the pressure in chamber 174 is greater than approximately 7 p.s.i. Since the service brake pressure developed in lines 160 and 36 which is communicated to chamber 174, is normally much higher than this when the brakes are in operation and since the booster unit 152 is provided with a valve which normally maintains a residual pressure from 12 p.s.i. to 22 p.s.i., the valve 156 will be held closed under all normal conditions. However, a break or excessive leakage in the main brake service line will immediately be reflected by a reduction in the pressure in chamber 174 to a value substantially below 7 p.s.i. permitting the diaphragm assembly 172 to move to the left establishing communication between the ports 178 and 182 thereby returning the fluid in the emergency brake chambers to the reservoir in the master cylinder unit 150 to permit immediate application of the emergency brakes.

As in the previously described embodiment the emergency brakes may be released by operation of the tool 140.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims as therefore intended to be embraced therein.

What is claimed and desired to be secured by Letters Patent is:

1. In a brake actuator, a casing assembly having aligned service and emergency chambers extending oppositely from a common wall, a first fluid pressure responsive member in said service chamber, said member having a connection for a brake mechanism, a second fluid pressure responsive member in said emergency chamber, one of said members extending through said wall for operative engagement with the other member, means connecting the respective spaces between said members and said wall to fluid under pressure to urge said members away from said wall, a cover detachably secured to the outer end of said emergency chamber, said cover having a surface for limting the movement of said second member away from said wall, means in said cover providing a plurality of separate pockets circumferentially spaced around the axis of said actuator, a plurality of substantially identical springs, each spring being received in one of said pockets with a portion thereof peripherally enclosed by its respective pocket and each spring being compressed between said cover and said second fluid pressure responsive member and cooperating aligned central formations on said second fluid pressure responsive member and said cover, *at least one of said formations acting* to support and guide said springs at their non-enclosed portions.

2. The actuator assembly according to claim 1 wherein said formations comprise a threaded boss on said second fluid pressure responsive member and a hollow sleeve on said cover through which a tool may be inserted for attachment to said second fluid pressure responsive member to retract said member against said surface on said cover to permit disassembly of said cover, said springs and said second member from said casing assembly.

3. The actuator assembly according to claim 1 wherein each of said coil springs has a diameter less than half the diameter of said emergency chamber and said springs are positioned in equally spaced relation around the axis of said actuator.

References Cited

The following references, cited by the Examiner, are of record in the patented file of this patent or the original patent.

UNITED STATES PATENTS

| | | | |
|---|---|---|---|
| 3,020,094 | 2/1962 | Murty et al. | 303—9 |
| 3,144,812 | 8/1964 | Rager et al. | 91—170 |

MARTIN P. SCHWADRON, *Primary Examiner.*

I. C. COHEN, *Assistant Examiner.*

UNITED STATES PATENT OFFICE

CERTIFICATE OF CORRECTION

Reissue No. 26,432 August 6, 1968

Frank T. Cox, Jr., et al.

It is certified that error appears in the above identified patent and that said Letters Patent are hereby corrected as shown below:

In the heading to the printed specification, lines 5 and 6, "American Standard Inc.," should read -- Rockwell-Standard Company, Pittsburgh, Pa., --. Column 2, line 48, "pistons" should read -- piston --. Column 3, line 29, "brance" should read -- branch --; line 58, "comibned" should read -- combined --; line 63, before "the brake" insert -- to --; line 73, "reccess" should read -- recess --.

Signed and sealed this 13th day of January 1970.

(SEAL)
Attest:

Edward M. Fletcher, Jr.
Attesting Officer

WILLIAM E. SCHUYLER, JR.
Commissioner of Patents